May 14, 1940.   L. D. MINK   2,200,963
TREATMENT OF EGG WHITES
Filed Aug. 22, 1935   2 Sheets-Sheet 1

Leon D. Mink
INVENTOR

May 14, 1940. L. D. MINK 2,200,963
TREATMENT OF EGG WHITES
Filed Aug. 22, 1935 2 Sheets-Sheet 2

Leon D. Mink
INVENTOR

Patented May 14, 1940

2,200,963

UNITED STATES PATENT OFFICE 2,200,963

TREATMENT OF EGG WHITES

Leon D. Mink, Chicago, Ill., assignor to Industrial Patents Corporation, Chicago, Ill., a corporation of Delaware Application August 22, 1935, Serial No. 37,375

4 Claims. (Cl. 99—210)

This invention relates to a method of treating egg whites.

One of the objects of the invention is to provide a method for desiccating egg whites in such a manner that the desiccated egg whites may be reconstituted and utilized for such purposes as candy making and cake making in the manner of fresh egg whites.

Another object of the invention is to provide a desiccated egg white material which may be readily reconstituted in the manufacture of food products.

Another object of the invention is to provide a method for reconstituting desiccated egg whites coincidental with the manufacture of food products.

Other objects of the invention will be apparent from the description and claims which follow.

Egg whites are ordinarily dried by placing the egg whites in a pan and subjecting the contents of the pan to elevated temperatures in a drying tunnel until a dry flake is formed.

The desiccated egg whites are then scraped out of the pan and ground. This method of drying produces a small volume of the flaked product with a very tough texture and the product thus dried does not whip into a light batter when used for angel food cakes and similar products.

In China it is customary to permit egg whites to ferment for a definite period before drying. The drying operation is then carried out after fermentation in a manner similar to that which has already been described. The fermentation produces a bad flavor which is decidedly objectionable in the dried egg white and is distinguishable in most finished bakery products.

Spray drying brings about quick desiccation but is not applicable in the egg drying industry because the operations are widely distributed and carried on in small units with insufficient volume to justify the expense of spray drying equipment. Furthermore, spray dried whites when reconstituted do not equal fresh or frozen whites.

The present invention permits the production of dry egg whites which can be reconstituted to equal the original undried egg whites by the expedient of quick drying. In accordance with the present invention, the original egg whites are whipped to a foam which is then dried in an ordinary drying tunnel.

After drying the foam dried eggs are ground to a powder which may be reconstituted instantaneously during the whipping operations incident to cake making, rendering any small amount of insoluble material unnoticeable. I have found that egg whites so dried and so reconstituted produce angel food cake of superior volume and excellent texture.

The process of the present invention may be carried out with any desired apparatus. Suitable apparatus is illustrated in the drawings.

Figures 1, 4:
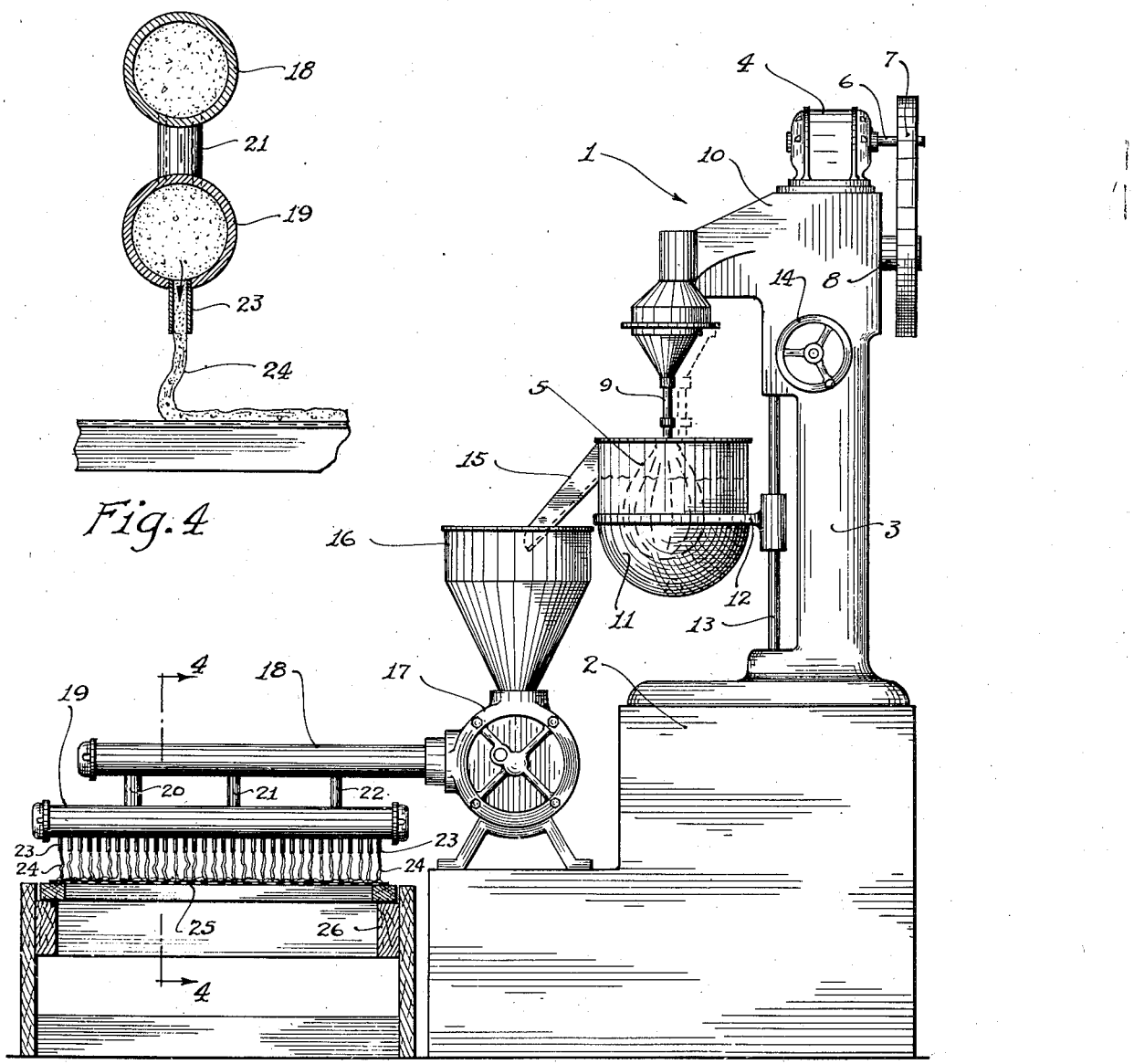
Figure 1 is a side view of the apparatus for producing the foam.
Figure 4 is a sectional view on line 4—4 of Figure 1.

Referring now more particularly to Figure 1: Machine 1 is mounted on platform 2 and comprises a main frame or standard 3 on which is mounted motor 4 driving whipper 5 through shaft 6, belt 7, shaft 8 and shaft 9, through appropriate gearing mechanism within the housing 10 of standard 3. Mixing bowl 11 is held in adjustable bracket 12, slidable on rod 13, hand wheel 14 being provided to adjust the height of bracket 12 through screw 35.

Liquid egg whites which may or may not have been previously frozen are placed in mixing bowl 11 and beaten to a froth by whipper 5. From mixer bowl 11 the beaten eggs pass through spout 15 and funnel 16 to pump 17 which forces the foam through line 18 communicating with discharging pipe 19 through lines 20, 21 and 22.

In order to assure even distribution of the egg whites I prefer in practice to increase the size of the lines leading from line 18 to pipe 19 as the distance is increased from the pump. For example, line 20 may be a one-inch pipe, line 21 a three-quarters-inch pipe and line 22 a one-half-inch pipe, assuming that pipe 18 and pipe 19 are two-inch pipes.

The egg foam forced into distributing pipe 19 in this manner passes out through a plurality of tubes 23 forming foam rods 24 on screen 25 which may be manually moved on rack 26 or carried under distributing pipe 19 by an endless conveyor.

Figure 2:
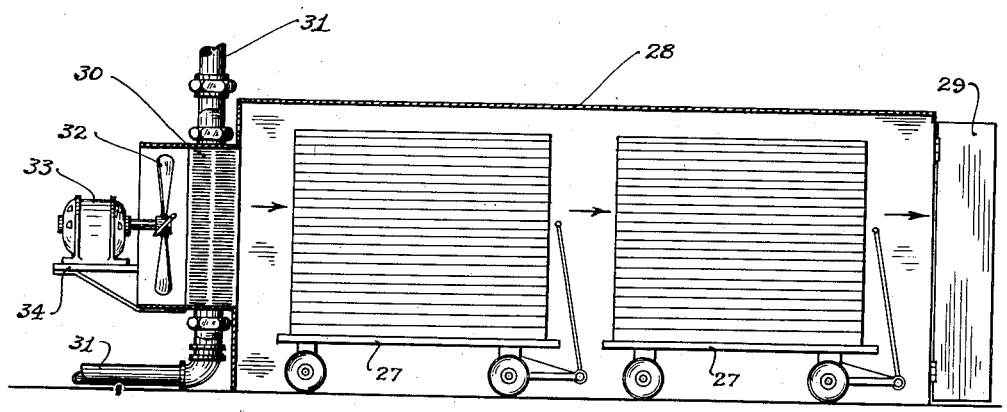
Figure 2 is a sectional view of an egg drying tunnel.
Figure 3:
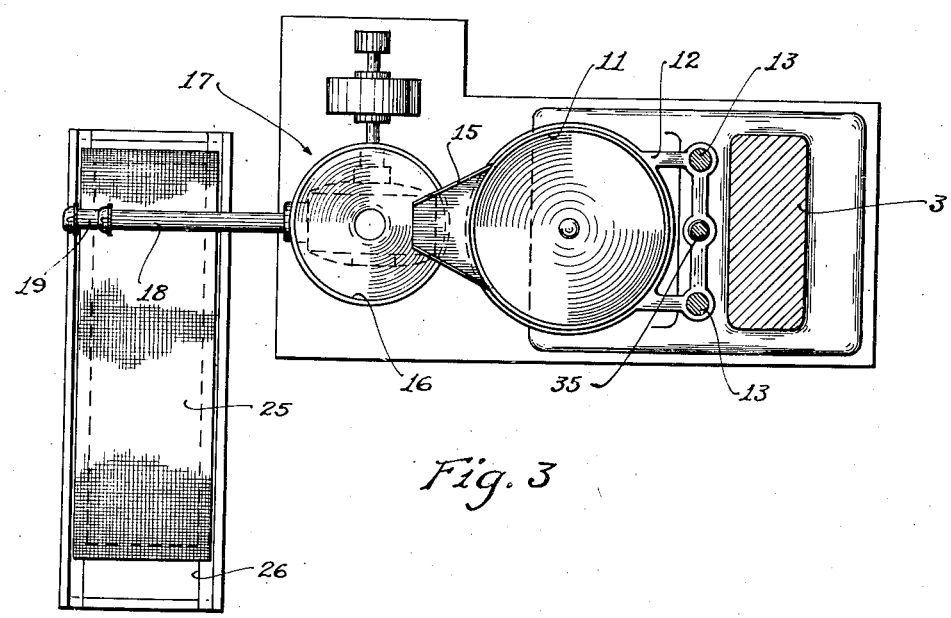
Figure 3 is a plan view of Figure 1.

After the foam rods are caught on the screen, a plurality of screens may be piled on trucks as 27 shown in Figure 2. In Figure 2 the trucks 27, piled with screens carrying egg foam in the form of rods, are shown in tunnel 28 provided with doors 29 which have been opened to admit and remove trucks.

Radiator 30 is supplied with the heating medium such as steam through line 31. A blast of air is driven over radiator 30 and into tunnel 28 by propeller fan 32 operated by motor 33 mounted upon standard 34.

It will be understood that the rate of drying is dependent upon the temperature, velocity of air, outside humidity, and general efficiency of the drying chamber as well as the size of the ribbon or stream of whipped egg white deposited upon the drying screens. I have found in practice that the drying should be completed in not more than one hour and at a temperature of 110° Fahrenheit to produce the most satisfactory product.

After drying, the product may be ground in any suitable mill, although I have found that the product is substantially subdivided very readily by passing it through rollers or rubbing or brushing it through the screen. The dried product may be packaged and held without deterioration for long periods of time.

I claim:

1. The method of treating egg whites which comprises whipping the egg whites to a foam and thereafter drying the egg whites in strands of foam.

2. The method of treating egg whites which comprises beating the egg whites into a foam, forming the foam in the form of ribbons, drying the ribbons within the space of an hour and thereafter grinding the dried ribbons.

3. The method of treating egg whites which comprises foaming egg whites, forming the foamed egg whites in strands, and quick drying the strands.

4. The method of treating egg whites which comprises beating the egg whites into a foam, forming the foam in the form of ribbons, drying the ribbons, and thereafter grinding the ribbons.

LEON D. MINK.